(12) United States Patent
Novak et al.

(10) Patent No.: US 9,447,339 B2
(45) Date of Patent: *Sep. 20, 2016

(54) HYDROPROCESSING OF BIODIESEL FUELS AND BLENDS

(75) Inventors: William J. Novak, Bedminster, NJ (US); Zhiguo Hou, Fairfax, VA (US); William J. Tracy, III, Burke, VA (US); Patrick L. Hanks, Fairfax, VA (US); Timothy L Hilbert, Fairfax, VA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 793 days.

This patent is subject to a terminal disclaimer.

(21) Appl. No.: 13/127,875

(22) PCT Filed: Nov. 6, 2008

(86) PCT No.: PCT/US2008/012516
§ 371 (c)(1),
(2), (4) Date: May 5, 2011

(87) PCT Pub. No.: WO2010/053468
PCT Pub. Date: May 14, 2010

(65) Prior Publication Data
US 2011/0219672 A1    Sep. 15, 2011

(51) Int. Cl.
*C10L 1/10*    (2006.01)
*C10L 1/00*    (2006.01)
(Continued)

(52) U.S. Cl.
CPC .............. *C10L 1/026* (2013.01); *C10G 45/64* (2013.01); *C10G 2300/1014* (2013.01);
(Continued)

(58) Field of Classification Search
CPC .......... C10L 1/026; C10L 1/08; Y02E 50/13; C10G 2300/1014; C10G 2300/202; C10G 2300/301; C10G 2300/304; C10G 2300/307; C10G 2300/4018; C10G 2300/1018; C10G 2300/1055; C10G 2300/4006; C10G 2300/207; C10G 2300/4012; C10G 2300/1011; C10G 2300/1051; C10G 2400/04; C10G 2400/08; C10G 3/50; C10G 3/47; C10G 3/46; C10G 3/49; C10G 3/42; C10G 3/48; C10G 45/02; C10G 45/64; C10G 65/04; C10G 65/043; C10G 1/026; C10G 1/08; C10G 50/13; Y02P 30/20
USPC ................ 208/60, 89, 49; 44/300, 307, 385
See application file for complete search history.

(56) References Cited

U.S. PATENT DOCUMENTS 5,705,722 A * 1/1998 Monnier et al. .............. 585/240
5,993,644 A * 11/1999 Xiao et al. ...................... 208/89
(Continued)

FOREIGN PATENT DOCUMENTS

EP    1741767 A1    10/2007
EP    1741768 A1    10/2007
(Continued)

OTHER PUBLICATIONS

Yori, Juan C.; D'Amato, Miguel A.; Grau, Javier M.; Pieck, Carlos L.; Vera, Carlos R., "Depression of the Cloud Point of Biodiesel by Reaction over Solid Acids", Energy and Fuel (2006) vol. 20, pp. 2721-2726.
(Continued)

*Primary Examiner* — Latosha Hines
(74) *Attorney, Agent, or Firm* — Larry E. Carter; Glenn T. Barrett; Chad A. Guice

(57) ABSTRACT

A method for producing diesel fuel from biocomponent feeds includes hydrotreating the feed followed by catalytic dewaxing with a ZSM-48 containing catalyst. The hydrotreated feed may be cascaded directly to the dewaxing step, or the hydrotreated feed can undergo intermediate separation. The diesel fuel resulting from processing of the biocomponent feed exhibits superior cetane values.

14 Claims, 2 Drawing Sheets

(51) Int. Cl.
  *C10L 1/18* (2006.01)
  *C10L 1/02* (2006.01)
  *C10G 45/64* (2006.01)

(52) U.S. Cl.
  CPC .............. *C10G 2300/1018* (2013.01); *C10G 2300/202* (2013.01); *C10G 2300/301* (2013.01); *C10G 2300/304* (2013.01); *C10G 2300/307* (2013.01); *C10G 2300/4018* (2013.01); *C10G 2400/04* (2013.01); *Y02E 50/13* (2013.01); *Y02P 30/20* (2015.11)

(56) References Cited

U.S. PATENT DOCUMENTS

| | | | |
|---|---|---|---|
| 7,279,018 B2 | 10/2007 | Jakkula et al. | |
| 7,955,401 B2* | 6/2011 | Ghonasgi et al. | 44/308 |
| 8,282,815 B2 | 10/2012 | Bouchy et al. | |
| 8,324,439 B2 | 12/2012 | Guillon et al. | |
| 8,389,781 B2* | 3/2013 | Sandstede et al. | 585/240 |
| 8,541,636 B2* | 9/2013 | Vergel | 585/240 |
| 2004/0004020 A1* | 1/2004 | Grove et al. | 208/49 |
| 2004/0055209 A1 | 3/2004 | Jakkula et al. | |
| 2006/0161032 A1 | 7/2006 | Murzin et al. | |
| 2006/0207166 A1 | 9/2006 | Herskowitz et al. | |
| 2006/0234860 A1 | 10/2006 | Brignac et al. | |
| 2006/0264684 A1 | 11/2006 | Petri et al. | |
| 2007/0006523 A1 | 1/2007 | Myllyoja et al. | |
| 2007/0010682 A1* | 1/2007 | Myllyoja et al. | 554/174 |
| 2007/0131581 A1 | 6/2007 | Lai et al. | |
| 2007/0135669 A1 | 6/2007 | Koivusalmi et al. | |
| 2007/0294938 A1 | 12/2007 | Jukkula et al. | |
| 2008/0045731 A1 | 2/2008 | Zhang | |
| 2009/0288988 A1* | 11/2009 | Mayeur et al. | 208/85 |
| 2010/0084313 A1* | 4/2010 | Helton et al. | 208/60 |
| 2010/0228068 A1 | 9/2010 | O'Connor et al. | 585/733 |
| 2011/0047862 A1* | 3/2011 | Mayeur et al. | 44/307 |
| 2011/0054230 A1* | 3/2011 | Cole et al. | 585/240 |
| 2011/0219672 A1 | 9/2011 | Novak et al. | |
| 2012/0053377 A1* | 3/2012 | Mizan et al. | 585/240 |

FOREIGN PATENT DOCUMENTS

| | | |
|---|---|---|
| EP | 2362892 A1 | 9/2011 |
| SE | 9700149 A | 8/1997 |
| WO | 2007003709 A1 | 1/2007 |
| WO | 2007033460 A1 | 3/2007 |
| WO | 2008035155 A2 | 3/2008 |
| WO | 2008101945 A1 | 8/2008 |
| WO | 2009038965 A1 | 3/2009 |

OTHER PUBLICATIONS

Kalnes, Tom; Marker, Terry; Shonnard, David R., "Green Diesel: A Second Generation Biofuel", International Journal of Chemical Reactor Engineering (2007) vol. 5, article A48.

* cited by examiner

HYDROPROCESSING OF BIODIESEL FUELS AND BLENDS

FIELD OF THE INVENTION

This invention relates to hydroprocessing of fuel feedstocks derived from biocomponent sources, as well as hydroprocessing of blends of biocomponent and mineral fuel feedstocks.

BACKGROUND OF THE INVENTION

Diesel fuel is subject to many standard specifications, including cold flow properties, such as Cloud Point and Cold Filter Plugging Point (CFPP). These cold flow properties are important to insure that the fuel reliably flows to the engine in low ambient temperature. In the US, ASTM D975 shows the 10% minimum ambient temperature per state as a guide to acceptable diesel cold flow properties. In the 48 contiguous states, the lowest minimum ambient temperature value is −34° C. Additionally, the lowest value reported for Alaska is −45° C. Similarly, home heating oil is subject to cold flow property specifications such as Pour Point.

Biodiesel is gaining growing acceptance as a diesel fuel component. 'Biodiesel' is typically fatty acid esters made from vegetable oil triglycerides, which can include various crops or waste oil, or other animal fats. The raw vegetable oil or animal fat triglycerides are reacted with methanol to form fatty acid esters, which have a viscosity within the diesel specification. Processing of algae can also yield similar triglycerides. The common term is "FAME," which stands for fatty acid methyl ester. A separate ASTM specification has issued that covers Biodiesel (D6751-07) when blended with conventional diesel, but some of the specifications are not consistent with conventional diesel specifications required for the mixed blend. For example, the biodiesel Cloud Point spec is shown as 'report only', with a footnote that it is usually higher than conventional diesel fuel and this need to be taken into consideration. Biodiesel fuels often have high cloud points. As a result, blends of biodiesel and conventional diesel may render the total blend unsuitable in terms of cold flow properties.

EP 1741767 A1 and 1741768 A1 describe methods for hydroprocessing diesel range feeds based on biocomponent sources, such as vegetable or animal fats/oils. The hydroprocessing methods include exposing the biocomponent feed to hydrotreating conditions, followed by a hydroprocessing step for isomerizing the feed. Isomerization catalysts identified in EP 1741767 A1 and EP 1741768 A1 include SAPO-11, SAPO-41, ZSM-22, ZSM-23, and ferrierite. The isomerization catalysts are described as also including a Group VIII metal such as Pt and a binder such as alumina. The lowest cloud points identified in the references are between −14 and −22° C. The levels of n-paraffins remaining in the isomerized diesel products were not specified.

US Published Patent Application 2007/0006523 describes methods for producing diesel fuels from a Tall Oil Fatty Acid (TOFA) fraction. The TOFA fraction is described as including triglycerides present in biocomponent feeds, such as rapeseed oil, suflower oil, or palm oil. The methods include hydrotreatment followed by isomerization. The most suitable isomerization catalysts are described as catalysts with low acidity. SAPO-11 bound with alumina and ZSM-22 or ZSM-23 bound with alumina are provided as examples of isomerization catalysts. The isomerization catalyst is also described as including a supported Group VIII metal such as Pt. No cloud points are provided for the diesel fuel products. The lowest reported number for the amount of n-paraffins in an isomerized product is 13%.

US Published Patent Application 2006/0207166 describes methods for hydroprocessing biocomponent feeds in a single step. The single step performs both hydrodeoxygenation and hydroisomerization. The catalyst for the single step is described as including both a metal component and an acidic component. The metal component is described as platinum or palladium. A wide variety of zeolites are described for the acidic component. A porous solid support may also be present. The lowest cloud points reported for diesel fuels made according to the process described in US 2006/0207166 are between −11 and −16° C. A cloud point below −20° C. is also reported in a comparative example. After processing, the reported diesel products had n-paraffin contents of at least 14.5%.

What is needed is a method for producing biocomponent based diesel fuels with improved properties to facilitate use in the commercial fuel supply. Preferably, the method would allow for production of diesel fuels that satisfy any current cold flow property requirements while also providing improved cetane.

SUMMARY OF THE INVENTION

In an embodiment, a method is provided for producing a diesel fuel product from a biocomponent feed. The method includes hydrotreating a feed having a boiling range from 215° F. to 800° F. that includes a biocomponent portion under effective hydrotreating conditions to produce a hydrotreated feedstock with a sulfur content of less than 50 wppm and a nitrogen content of less than 20 wppm. The hydrotreated feedstream is then dewaxed under effective catalytic dewaxing conditions by exposing the feedstream to a ZSM-48 containing catalyst.

In another embodiment, a diesel fuel product is provided that is based on a biocomponent source. The diesel fuel has a cetane index of at least 75, a cloud point of −35° C. or less, and an n-paraffin content of less than 10%.

DETAILED DESCRIPTION OF THE PREFERRED EMBODIMENTS

Figure 1:
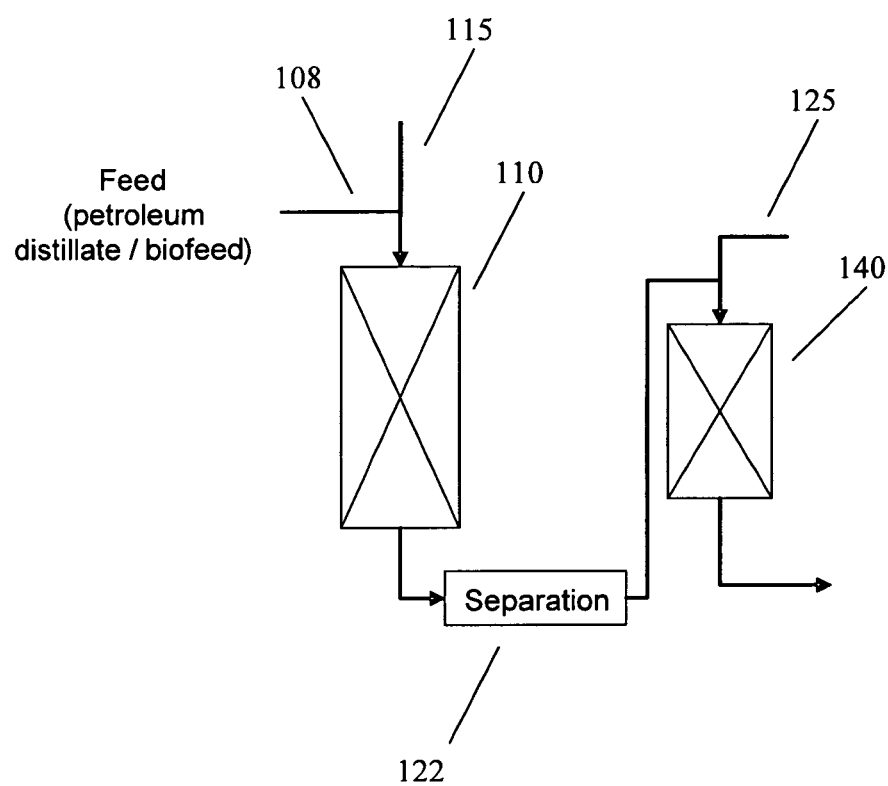
FIG. 1 depicts a reaction system suitable for performing a process according to the invention.

In various embodiments, the invention provides for use of catalytic dewaxing to treat biodiesel feeds, in order to improve properties and mitigate the problems described above. Some improved properties are achieved by dewaxing a biocomponent containing feed with a catalyst containing a 1-D 10 member ring molecular sieve, such as ZSM-48. Further unexpected improvements are also achieved by providing the biocomponent containing feed to the dewaxing stage with a sufficiently low content of sulfur and nitrogen contaminants.

Biodiesel, blended with conventional diesel or alone, may be processed directly by catalytic dewaxing. Alternatively, the biodiesel or biodiesel blend can be hydrotreated first and then catalytically dewaxed, either in an integrated unit or a stand-alone unit. The hydrotreatment stage allows for removal of contaminants that may have some effect on the catalytic dewaxing catalysts. In the case of an integrated unit, a stripper may optionally be employed between the hydrotreating and dewaxing stages to remove some byproducts.

Preferably, the catalytic dewaxing step is performed by exposing the feed to a ZSM-48 containing catalyst. Applicants have unexpectedly found that ZSM-48 containing catalysts provide superior results for processing biocomponent diesel feeds. In particular, ZSM-48 containing catalysts according to the invention are well-suited for isomerizing a feed to form biodiesel while minimizing cracking reactions. Still further advantages are realized in embodiments where the feed to the stage having the ZSM-48 containing catalyst has a sufficiently low content of sulfur and nitrogen contaminants.

Feedstocks

In the discussion below, a biocomponent feedstock refers to a hydrocarbon feedstock derived from a biological raw material component, such as vegetable fats/oils or animal fats/oils (including fish and algae fats/oils). Note that for the purposes of this document, vegetable fats/oils refer generally to any plant based material, and include fat/oils derived from a source such as plants from the genus Jatropha. The vegetable oils and animal fats that can be used in the present invention include any of those which comprise primarily triglycerides and free fatty acids (FFA). The triglycerides and FFAs contain aliphatic hydrocarbon chains in their structure having 8-24 carbons. Other types of feed that are derived from biological raw material components include fatty acid esters, such as fatty acid methyl esters. Examples of biocomponent feedstocks include but are not limited to rapeseed (canola) oil, corn oil, soy oils, castor oil, and palm oil.

A mineral hydrocarbon feedstock refers to a hydrocarbon feedstock derived from crude oil that has optionally been subjected to one or more separation and/or other refining processes. Preferably, the mineral hydrocarbon feedstock is a petroleum feedstock boiling in the distillate range or above. Examples of suitable feedstocks include virgin distillates, hydrotreated virgin distillates, light gas oils, heavy gas oils, light catalytic cycle oils, light cycle oils, and vacuum gas oils.

Diesel boiling range feedstreams suitable for use in the present invention boil within the range of about 215° F. to about 800° F. Preferably, the diesel boiling range feedstream has an initial boiling point of at least 250° F., or at least 300° F., or at least 350° F., or at least 400° F., or at least 451° F. Preferably, the diesel boiling range feedstream has a final boiling point of 800° F. or less, or 775° F. or less, or 750° F. or less. In an embodiment, the diesel boiling range feedstream has a boiling range of from 451° F. to about 800° F. In another embodiment, the diesel boiling range feedstream also includes kerosene range compounds to provide a feedstream with a boiling range of from about 250° F. to about 800° F.

Biocomponent based diesel boiling range feedstreams typically have low nitrogen and sulfur content. Instead of nitrogen and/or sulfur, the primary heteroatom component in biocomponent based feeds is oxygen. Suitable biocomponent diesel boiling range feedstreams can include up to about 1 wt % oxygen. Mineral feedstreams for blending with a biocomponent feedstream can have a nitrogen content from about 50 to about 2000 wppm nitrogen, preferably about 50 to about 1500 wppm nitrogen, and more preferably about 75 to about 1000 wppm nitrogen. In an embodiment, feedstreams suitable for use herein have a sulfur content from about 100 to about 40,000 wppm sulfur, preferably about 200 to about 30,000 wppm, and more preferably about 350 to about 25,000 wppm.

In various embodiments of the invention, a diesel boiling range feed can include both feeds from biocomponent sources, such as vegetable sources or animal sources, or feeds from mineral sources. The feed can include varying amounts of feedstreams based on biocomponent sources, such as vegetable oils, animal fats, fish oils, algae oils, etc. The feed can include at least 15 wt % of feed based on a biocomponent source, or at least 30 wt %, or at least 50 wt %, or at least 70 wt %. A diesel range boiling feed that is substantially based on bicomponent feed refers to a feed that contains one or more biocomponent feedstreams and possibly one or more additives. The one or more additives can include additives made from a mineral feed that would not be considered suitable alone as a diesel fuel, but that boil in the diesel range. A diesel range boiling feed that consists essentially of biocomponent feed can also contain one or more additives, but the additives must either also be biocomponent based, or must boil outside of the diesel boiling range.

The various location-based requirements and specifications for U.S. diesel fuel are provided in ASTM D975. Other similar regulations exist for Europe, Canada, and other countries. These specifications typically include a requirement that sulfur be reduced in the diesel product to 15 wppm or less. Additionally, the cloud point specification is widely variable, but winter month specifications routinely require a cloud point well below −25° C. For example, depending on the region, the cloud point specification could be −34° C. or less, or −40° C. or less, or −45° C. or less.

In situations where a feed is delivered to a dewaxing stage without prior treatment to remove sulfur and/or nitrogen contaminants, additional benefits can be achieved by selecting a feed with a low sulfur and nitrogen content. Preferably, the sulfur content of the feed will be less that 5 wppm, more preferably less than 3 wppm. Preferably, the nitrogen content of the feed will be less than 5 wppm, more preferably less than 3 wppm.

Hydroprocessing

The primary purpose of hydrotreating for mineral feeds is typically to reduce the sulfur, nitrogen, and aromatic content of a feed. Catalysts usually contain at least one of Group VIA and Group VIII metal on a support such as alumina or silica. Examples include Ni/Mo, Co/Mo and Ni/W catalysts. Hydrotreating conditions typically include temperatures of 315-425° C., pressures of 300-3000 psig, Liquid Hourly Space Velocities (LHSV) of 0.2-10 $h^{-1}$ and hydrogen treat rates of 500-10000 scf/bbl.

During hydrotreatment, the sulfur and nitrogen contents of a feedstock are reduced. In an embodiment, the hydrotreating step preferably reduces the sulfur content to a suitable level, such as less than 50 wppm, or less than 25 wppm, or less than 10 wppm. In another preferred embodiment, the hydrotreating step reduces the sulfur content of the feed to less than 5 wppm, preferably less than 3 wppm. With regard to nitrogen, the hydrotreating step preferably reduces the nitrogen content of the feed to 20 wppm or less, or 10 wppm or less, or 5 wppm or less, or 3 wppm or less.

For biocomponent feeds, the sulfur, nitrogen, and aromatic contents are often low. However, hydrotreatment can also reduce the oxygen content of biocomponent feeds. Deoxygenating a feed can avoid problems with catalyst poisoning or deactivation due to the creation of water or carbon oxides during hydroprocessing. In embodiments where a biocomponent feed is hydrotreated prior to isomerization, the biocomponent feed can be substantially deoxygenated in the hydrotreatment step. This corresponds to removing at least 90%, or at least 95%, or at least 98%, or at least 99% of the oxygen present in the biocomponent feedstock. Alternatively, substantially deoxygenating the feedstock can correspond to reducing the oxygenate level of the total feedstock to 0.1 wt % or less, or 0.05 wt % or less, or 0.01 wt % or less, or 0.005 wt % or less. After a hydrotreatment process, a hydrotreated biocomponent feed will also have increased similarity to a mineral oil feed. One exception to this is that a hydrotreated biocomponent feed will generally have less favorable cold flow properties relative to a comparable mineral feed. While a hydrotreated biocomponent feed can have the viscosity characteristics of a diesel fuel, the cold flow properties will typically restrict the use of a hydrotreated biocomponent feed to, for example, a diesel fuel that is suitable only for warm weather applications. However, the cold flow properties of the hydrotreated biocomponent feed can be improved by subsequently dewaxing the feed using catalytic dewaxing.

Catalytic dewaxing relates to the removal and/or isomerization of long chain, paraffinic molecules from feeds. Catalytic dewaxing can be accomplished by selective hydrocracking or by hydroisomerizing these long chain molecules. Hydrodewaxing catalysts are suitably molecular sieves such as crystalline aluminosilicates (zeolites) or silico-aluminophosphates (SAPOs). These catalysts may also carry a metal hydrogenation component, preferably Group VIII metals, especially Group VIII noble metals. Hydrodewaxing conditions include temperatures of 280-380° C., pressures of 300-3000 psig, LHSV of 0.1-5.0 h$^{-1}$ and treat gas rates of from 500-5000 scf/bbl.

In various embodiments, the molecular sieve used for hydrodewaxing is ZSM-48. ZSM-48 is a 10-member ring 1-D molecular sieve. ZSM-48 performs dewaxing primarily by isomerizing molecules within the feed. Typical silica to alumina ratios for the ZSM-48 are 250 to 1 or less, or 200 to 1 or less. Preferably, the silica to alumina ratio of the ZSM-48 is less than 110 to 1. To form a catalyst, the ZSM-48 can be composited with a binder. Suitable binders include silica, alumina, silica-alumina, titania, zirconia, or a mixture thereof. Other suitable binders will be apparent to those of skill in the art.

Typical mineral distillate feeds suitable for conversion into a diesel fuel product have initial cloud points ranging from about −20° C. to about 5° C. The initial cloud point of biocomponent feeds can be higher still, including feeds with an initial cloud point of up to about 20° C. In order to form a suitable diesel fuel product for winter conditions, catalytic dewaxing conditions can be selected to reduce the cloud point by at least about 10° C., or at least about 20° C., or at least about 30° C., or at least about 40° C., or at least about 50° C.

A reaction system suitable for carrying out the above processes is shown schematically in FIG. 1. In FIG. 1, a feedstock that includes at least a biocomponent portion 108 is introduced into a first hydrotreatment reactor 110. The biocomponent portion of the feed can be up to 100% of the feed. A hydrogen treat gas stream 115 is also introduced into hydrotreatment reactor 110. The combined feedstock is exposed to hydrotreating conditions in first hydrotreatment reactor 110 in the presence of one or more catalyst beds that contain hydrotreating catalyst. In an embodiment, the hydrotreatment reactor can include one or more hydrotreatment stages. Preferably, this reduces the oxygen content of the treated feedstock to a suitable level, such as 0.01 wt % or less. In an embodiment, the hydrotreating step preferably reduces the sulfur content to a suitable level, such as less than 50 wppm, or less than 25 wppm, or less than 10 wppm. It is noted that levels of sulfur above 50 wppm prior to hydrotreatment will be more typical for feeds that include a mineral feed component. In another preferred embodiment, the hydrotreating step reduces the sulfur content of the feed to less than 5 wppm, preferably less than 3 wppm. With regard to nitrogen, the hydrotreating step preferably reduces the nitrogen content of the feed to 10 wppm or less, or 5 wppm or less, or 3 wppm or less.

The treated feedstock optionally flows into a separation device 122, where gas phase products are separated from liquid phase products. Separation device 122 may be a separator, a stripper, or a combination of separator and stripper functionality, such as a fractionation tower. Optionally, a portion of the gas phase products separated by separation device 122 may be cascaded back to the first reactor as a recycled hydrogen treat gas stream (not shown), or to the second reactor as a recycled hydrogen treat gas stream. Prior to entering a reactor, the recycled hydrogen treat gas is preferably passed through a water gas shift reactor, an amine scrubber, and/or other treatment components to remove excess carbon oxides from the treat gas.

In embodiments where a separation device is not employed, the hydrotreated feedstock can be cascaded to the dewaxing reactor without intermediate separation. In such embodiments, any gas phase species produced during hydrotreatment are passed to the dewaxing reactor along with the desired hydrotreated feedstock.

In an alternative embodiment, a portion of the treated feedstock from the first hydrotreatment reactor may be recycled and added to the input feedstream 108. One benefit of recycling treated feedstock to the first hydrotreatment reactor is to reduce the heat generated from hydrotreatment of biocomponent feeds. Due to the large amount of oxygen typically present in biocomponent feeds, deoxygenation of the feed can be a highly exothermic process. Recycling a portion of the treated feedstock to the first hydrotreatment reactor dilutes the untreated feedstock, and therefore reduces the amount of heat release per volume of total feed.

Other methods are also available for controlling the temperature of the first hydrotreatment reactor. One cooling method is to introduce a quench stream into the reactor, such as a cold hydrogen quench stream. The quench stream can be introduced at any convenient place in the reactor. For example, if the hydrotreatment reactor contains multiple beds, the quench stream could be introduced between two beds. Still another method of heat control is to use a "boiling water" reactor as the first hydrotreatment reactor. In such a reactor, the catalyst is contained in tubes that are surrounded by a heat transfer medium, such as boiling water. The ratio of surface area to volume is dramatically increased for such a reactor, which also allows for greater heat transfer.

After passing through first hydrotreatment reactor 110 and optionally separation device 122, the treated feedstock enters dewaxing reactor 140. The hydrotreated feedstock is exposed to catalytic dewaxing conditions in the presence of a ZSM-48 containing catalyst. Additional hydrogen 125 is provided to the dewaxing step. In various embodiments, additional hydrogen 125 can be recycled hydrogen, make-up hydrogen, or a combination thereof.

In FIG. 1, the reactors for hydrotreatment and dewaxing are shown as separate reactors. Alternatively, the hydrotreatment and dewaxing stages can be contained in a single reactor.

In another embodiment, a diesel fuel can be made from a blend of mineral and biocomponent feed by first hydrotreating the mineral feed, and then introducing the biocomponent feed into the feedstream prior to dewaxing. Such an embodiment could be valuable for refineries that have limited additional hydrogen availability, due to the large amount of hydrogen that can be consumed during deoxygenation of a raw biocomponent feed. In such an embodiment, the biocomponent feed added prior to the dewaxing stage would represent a biocomponent feed that has already been deoxygenated, such as by separate hydrotreatment at another facility. Preferably, the sulfur content of the combined hydrotreated mineral feedstock and deoxygenated biocomponent feedstock is less than 5 wppm, more preferably less than 3 wppm. Preferably, the nitrogen content of the combined hydrotreated mineral feedstock and deoxygenated biocomponent feedstock is less than 5 wppm, more preferably less than 3 wppm.

Figure 2:
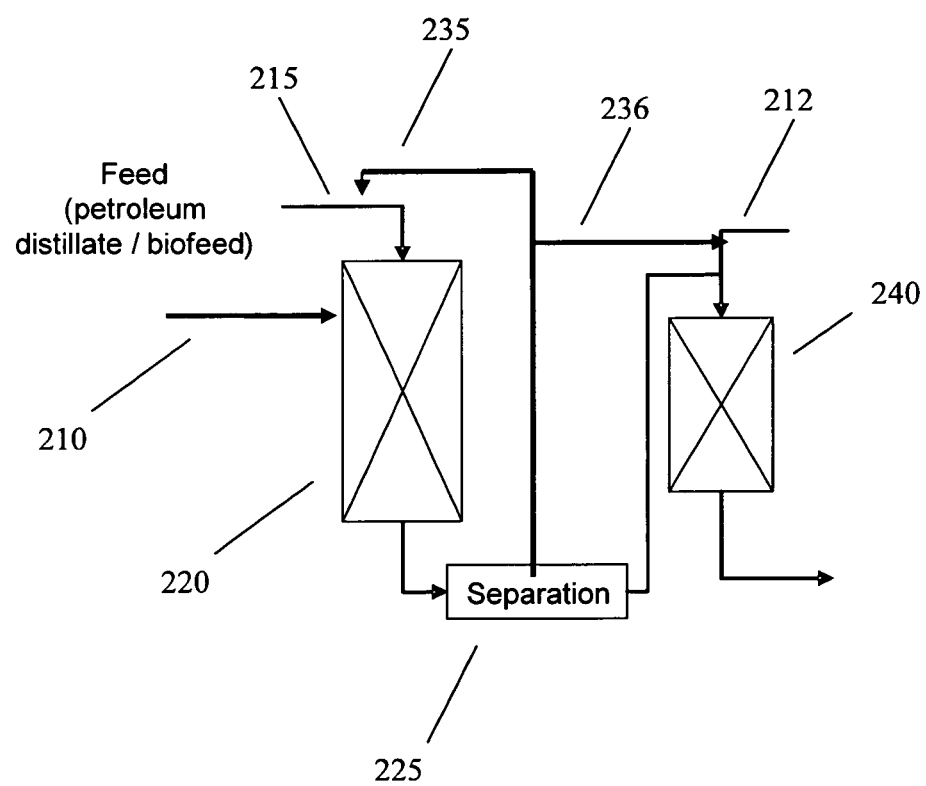
FIG. 2 depicts a reaction system suitable for performing a process according to the invention.

A reaction system suitable for carrying out the above processes is shown schematically in FIG. 2. In FIG. 2, a mineral hydrocarbon feedstock 210 is introduced into a first hydrotreatment reactor 220. A hydrogen treat gas stream 215 is also introduced into hydrotreatment reactor 220. The mineral hydrocarbon feedstock is exposed to hydrotreating conditions in first hydrotreatment reactor 220 in the presence of one or more catalyst beds that contain hydrotreating catalyst. Preferably, the hydrotreatment reduces the sulfur content of the treated feedstock to about 50 ppm by weight or less, or about 10 wppm or less, or about 5 wppm or less, or about 3 wppm or less. Preferably, the hydrotreatment reduces the nitrogen content of the treated feedstock to about 10 wppm or less, or about 5 wppm or less, or about 3 wppm or less. The treated feedstock optionally flows into a separation device 225, where gas phase products are separated from liquid phase products. Optionally, a portion of the gas phase products separated by separation device 225 may be cascaded back to the first reactor as a recycled hydrogen treat gas stream 235. In such an embodiment, recycled hydrogen treat gas stream 235 is combined with hydrogen treat gas stream 215 prior to entering first hydrotreatment reactor 220. Optionally, a portion of the gas phase products separated by separation device 225 may be cascaded to the second reactor as a recycled hydrogen treat gas stream 236.

After passing through first hydrotreatment reactor 220 and optionally separation device 225, the treated mineral hydrocarbon feedstock is combined with biocomponent feedstock 212 prior to entering dewaxing reactor 240. The combined feedstock is exposed to hydrotreating conditions in the presence of one or more catalyst beds that contain a dewaxing catalyst, preferably a ZSM-48 containing catalyst.

Diesel Product Properties

The diesel fuel produced by the above processes has improved characteristics relative to diesel fuel produced by other dewaxing processes. The diesel fuel product can have a cetane value (ASTM D976) of at least 70, or at least 75, or at least 80. Alternatively, the diesel fuel product can have a cetane index (ASTM D4737) of at least 75, or at least 80, or at least 85, or at least 90. The diesel fuel product can have an n-paraffin content of less than 10% by weight, or less than 8%, or less than 6.5%, or less than 5%. The cloud point of the diesel fuel can be −30 C or less, or −35 C or less, or −40 C or less. The portion of the diesel product based on a biocomponent feed can be at least 15 wt %, or at least 30 wt %, or at least 50 wt %, or at least 70 wt %.

EXAMPLE

A pilot plant study was used to demonstrate the ability of a ZSM-48 catalyst to improve the cloud point of a biocomponent feed. The study was carried out in two steps. The first step was designed to produce a feed containing primarily hydrotreated palm oil. A feed containing 70% of a mineral diesel feed and 30% palm oil was processed under hydrotreatment conditions in the presence of a commercial CoMo hydrotreatment catalyst. The hydrotreatment conditions included a temperature of 635° F., a pressure of 380 psig, a treat gas rate of 780 scf/bbl of 80% hydrogen, and a space velocity (LHSV) of 0.6 h$^{-1}$. The palm oil was a pretreated palm oil that had been a) refined to remove impurities such as phospholipids, gums and proteins, and b) bleached to remove residual phosphatides, metals, and oxidation products. After the hydrotreatment, a new feed was made containing 70% of the hydrotreated product from the previous run, and 30% palm oil. This cycle was repeated 10-15 times, leading to a final hydrotreated product. In the final hydrotreated product, about 5 wt % was based on the initial mineral feed, while the remainder of the product corresponded to the hydrotreated palm oil. This method for producing the hydrotreated biocomponent feed was selected to avoid problems due to heat release during deoxygenation of the palm oil. Although a recycle stream was used to generate the hydrotreated product, it is believed that a similar hydrotreated product could be achieved by suitably controlling the temperature in a reactor without recycle.

Properties for the hydrotreated palm oil product are shown below in Table 1. Table 1 also shows some properties for the palm oil prior to hydrotreatment.

TABLE 1

| Palm oil properties | | | |
|---|---|---|---|
| | Refined and bleached palm oil | Hydrotreated palm oil | |
| API Gravity | 23.2 | 50.0 | |
| Carbon | 76.85 | 83.5 | mass % |
| Hydrogen | 12.15 | 14.95 | mass % |
| Nitrogen | <10 | 2.5 | ppm |
| Sulfur | <5 | <5 | ppm |
| Bromine Number | | 0.05 | |
| GCD Distillation | | | |
| .5 PCT OFF - SIMDIS | | 369.8 | ° F. |
| 5 PCT OFF - SIMDIS | | 517 | ° F. |
| 10 PCT OFF - SIMDIS | | 521.4 | ° F. |
| 50 PCT OFF - SIMDIS | | 578.1 | ° F. |
| 90 PCT OFF - SIMDIS | | 609.1 | ° F. |
| 95 PCT OFF - SIMDIS | | 610.9 | ° F. |
| 99.5 PCT OFF - SIMDIS | | 769.7 | ° F. |
| Cloud Point | 25 | 17 | ° C. |
| Pour Point | 14 | 15 | ° C. |
| CFPP | | 9.4 | ° C. |
| Cetane index (ASTM D4737) | | 102.3 | |

Table 1 shows that the resulting hydrotreated product has an unusually high cetane index. Without being bound by any particular theory, it is unexpected that hydrotreatment at a low pressure, such as 500 psig or less, or 400 psig or less, can provide the demonstrated cetane benefit for the resulting hydrotreated product. Hydrotreatment results in some cloud point production, but the cloud point of the resulting hydrotreated product would restrict the use of the product as a diesel fuel to warmer weather conditions.

In the second step, the hydrotreated palm oil feed was exposed to a dewaxing catalyst under dewaxing conditions. The catalyst used was alumina bound ZSM-48 (90:1 silica to alumina ratio in the zeolite) with 0.6 wt % Pt supported on the catalyst. The hydrotreated feed was exposed to the catalyst at a reactor pressure of 600 psig, 2000 SCF/bbl of 100% H₂, and an LHSV of 2.14 for a series of reactor temperatures. The results of the catalytic dewaxing at the various temperatures are shown below in Table 2.

TABLE 2

Catalytic dewaxing of hydrotreated palm oil

| | Temperature, ° F. | | | | |
|---|---|---|---|---|---|
| | 620 | 630 | 640 | 650 | 670 |
| Cloud, ° C. | −30 | −43.9 | −46.9 | −49.7 | −60.8 |
| Pour, ° C. | −58 | −70 | −75 | <−80 | −95 |
| H2 consumption, scf/bbl | 150 | 174 | 184 | 189 | 304 |
| 400+° F. conversion, % | 10.9 | 11.3 | 13.0 | 16.1 | 28.2 |
| Cetane index (ASTM D4737) | 104.0 | 90.1 | 89.8 | 90.3 | 62.7 |

As shown in Table 2, the catalytic dewaxing provided a substantial cloud point and pour point reduction at all of the test conditions. At the temperatures of 650° F. and lower, the catalytic dewaxing provided a diesel product in high yield with excellent cold flow properties. At 670° F., the data show an increase in the amount of cracking to lighter molecules. This is indicated both in the increase in H₂ consumption and in the increase in 400+° F. conversion. Note that the 400+° F. conversion represents both converted gas phase and liquid phase products.

Table 2 also indicates that high cetane index values have been retained after achieving the desired cloud point reduction. Relative to conventionally produced hydrotreated oils, the hydrotreated oil shown in Table 2 has an unusually high cetane index, due to a high normal paraffin content. The dewaxing process converts the normal paraffins to predominantly iso-paraffins. The cetane index is only reduced slightly by the dewaxing process under most dewaxing conditions, although an increase in cetane index is achieved for the diesel product dewaxed at 620° F.

As shown in Table 2, the inventive process minimizes the cetane reduction, leading to high cetane index values in a diesel fuel suitable for use under any current standard. Typical cetane index specifications are 45-51, with sometimes 55 or so being discussed. By contrast, the diesel fuel produced according to the claimed invention, as exemplified in Table 2, is a clearly superior diesel fuel, which far exceeds any current specification for both cloud point and cetane.

The high quality results achieved by the inventive process are due in part to the ability to nearly completely isomerize the paraffinic molecules in a biocomponent diesel feed while minimizing cracking of the paraffins. Table 3 shows the n-paraffin and branched product content of the hydrotreated palm oil feed and the feed after dewaxing at various temperatures. The hydrotreated palm oil is composed primarily of C15-C18 hydrocarbons. Table 3 shows that 89% of the hydrotreated palm oil is a C15-C18 n-paraffin.

By contrast, the dewaxed diesel products have low n-paraffin contents. For C15-C18 hydrocarbons, the product dewaxed at 620° F. has an n-paraffin content of less than 8%. The products dewaxed at 630° F. to 650° F. have n-paraffin contents of less than 5%. At 670° F., the dewaxed product also has a low n-paraffin content, but this is somewhat mitigated by the increased level of cracking mentioned above.

TABLE 3

| | Feed | Dewaxing Temperature (° F.) | | | | |
|---|---|---|---|---|---|---|
| | | 620 | 630 | 640 | 650 | 670 |
| C5-C9 | 0.80 | 8.06 | 6.69 | 7.25 | 9.27 | 15.05 |
| C10-C14 | 2.43 | 10.54 | 12.48 | 15.03 | 17.41 | 25.08 |
| nC15 | 19.30 | 1.37 | 0.71 | 0.87 | 0.65 | 0.35 |
| branched C15 | 0.68 | 17.85 | 18.75 | 19.29 | 18.16 | 17.20 |
| nC16 | 19.60 | 1.21 | 0.81 | 0.59 | 0.64 | 0.39 |
| Branched C16 | 0.91 | 19.82 | 20.64 | 20.69 | 20.31 | 18.20 |
| nC17 | 25.46 | 1.31 | 0.97 | 0.41 | 0.23 | 0.21 |
| Branched C17 | 1.74 | 23.88 | 24.25 | 23.17 | 22.28 | 17.30 |
| nC18 | 24.73 | 0.74 | 0.29 | 0.19 | 0.15 | 0.06 |
| Branched C18 | 1.52 | 13.41 | 12.55 | 10.73 | 9.50 | 5.05 |
| >C18 | 2.84 | 1.80 | 1.86 | 1.78 | 1.41 | 1.12 |

The invention claimed is:

1. A method for producing a diesel fuel, comprising:
Hydrotreating a feed consisting of a boiling range from 215° F. to 800° F. (102° C. to 427°C.) that includes at least 70 wt % of a biocomponent portion under effective hydrotreating conditions to produce a hydrotreated, substantially deoxygenated feedstream with a sulfur content of less than 50 wppm and a nitrogen content of less than 20 wppm, the effective hydrotreating conditions comprising a pressure of 500 psig or less;
Separating gas phase products from liquid phase products in the hydrotreated feedstream; and
Dewaxing the hydrotreated feedstream under effective catalytic hydrodewaxing conditions by exposing the feedstream to a ZSM-48 catalyst containing a Group VIII noble metal hydrogenation component at a temperature of 345° C. or less, in the presence of hydrogen to produce a hydrotreated, hydrodevvaxed diesel fuel product having a cetane index of at least 75, a cloud point of −35° C. or less, and an n-paraffin content of less than 10%.

2. The method of claim 1 wherein the biocomponent portion includes at least one of vegetable fat or oil, animal fat or oil, fish fat or oil, or algae fat or oil.

3. The method of claim 1 wherein the effective catalytic dewaxing conditions are selected to reduce the weight percentage of n-paraffins in the feedstream by more than 90%.

4. The method of claim 1 wherein the effective catalytic dewaxing conditions include a temperature of at least 280°C., a total pressure of 300-3000 psig (2.1-20.6 MPa), LHSV of 0.1-5.0 h-1, and a treat gas rate of from 500-5000 scf/bbl.

5. The method of claim 1 wherein effective hydrotreating conditions include exposing the feed to a catalyst including at least one hydrogenation metal at a temperature of 315-425°C., pressure of at least 300 psig, Liquid Hourly Space Velocities (LHSV) of 0.2-10 h-1, and hydrogen treat rate of 500-10000 scf/bbl.

6. The method of, claim 1 wherein n-paraffin content of the initial feed is at least 80% by weight.

7. The method claim 1 wherein the method further comprises stripping the hydrotreated feedstream prior to dewaxing.

8. The method of claim 1 in which the hydrotreating conditions include a pressure of less than 400 psig (2.78 MPag).

9. The method of claim 1 in which the cloud point of the hydrotreated, hydrodewaxed diesel fuel is −40°C. or less.

10. The method of claim 1 in which the n-paraffin content of the hydrotreated, hydrodewaxed diesel fuel is 8% or less.

11. The method of claim 1 in which the n-paraffin content of the hydrotreated, hydrodewaxed diesel fuel is 5% or less.

12. The method of claim 1 in which the cetane index of the hydrotreated, hydrodewaxed diesel fuel is at least 85.

13. The method of claim 1 in which the Group VIII noble metal hydrogenation component is platinum.

14. The method of claim 1 in which the Group VIII noble metal hydrogenation component comprises 0.6 wt. percent platinum.

\* \* \* \* \*